R. BARTHOLOMÄUS.
MEANS FOR DRILLING POLYGONAL HOLES.
APPLICATION FILED MAY 5, 1921.

1,423,072. Patented July 18, 1922.

INVENTOR

Rudolf Bartholomäus

UNITED STATES PATENT OFFICE.

RUDOLF BARTHOLOMÄUS, OF BERLIN, GERMANY.

MEANS FOR DRILLING POLYGONAL HOLES.

1,423,072.     Specification of Letters Patent.     Patented July 18, 1922.

Application filed May 5, 1921. Serial No. 466,972.

*To all whom it may concern:*

Be it known that I, RUDOLF BARTHOLOMÄUS, residing at Berlin, Germany, have invented certain new and useful Improvements in Means for Drilling Polygonal Holes (for which I have filed application in Germany Feb. 6, 1919, # B 88,381), of which the following is a specification.

This invention relates to devices for drilling polygonal holes and to means for producing the special kind of drill required for this purpose.

The invention is illustrated in the drawings in which—

Figure 1:
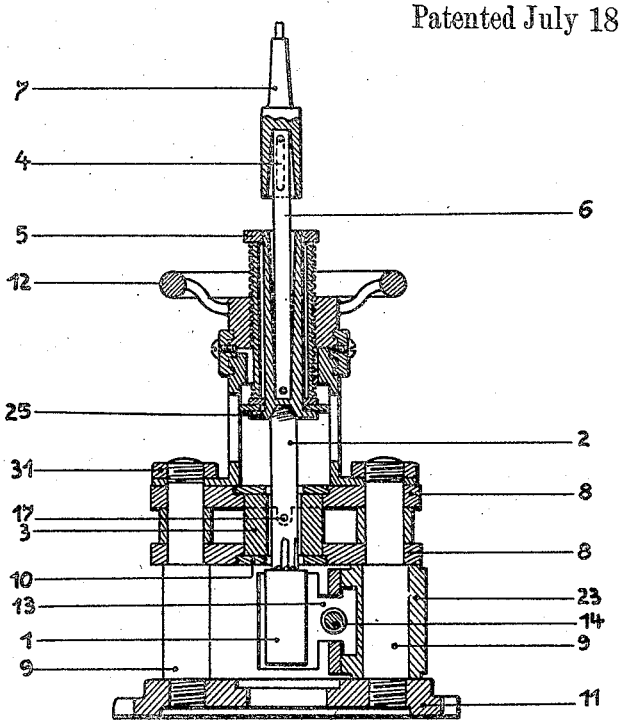
Fig. 1 is a longitudinal vertical section through the drilling attachment.
Figure 2:
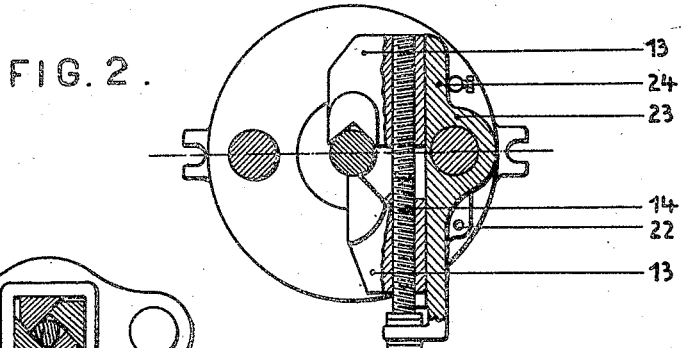
Fig. 2 is a transverse section through Fig. 1 taken on the horizontal middle line through the screw 14.

The drilling attachment is constructed as follows:

Fixed in the base plate 11 are posts 9 and revolubly mounted upon the right hand post is a clamping device or work-holder 23 for the work 1 which is clamped fast between the jaws 13 by turning the clamping screw by means of the four-cornered head 21. The jaws 13 differ from each other in shape and are formed so as to engage with the work along three continuous lines and to hold it in the central position. In order to cause pieces of work of all diameters to be held in the central position by the jaws of the work-holder the spindle 14 has two different threads for the two jaws. To insert the work the work-holder is swung outwards upon its post 9 and then swung back again into the position in which it abuts against the stop 24 whereupon it is secured by a pin 22.

The drill 2 is screwed into a socket 25 which is connected by a driving rod 6 to the conical spindle sleeve 7 of a drilling machine in such a manner as to permit the drill to execute oscillating motions. The driving rod 6 has a pin which projects into a slot 4 of the conical sleeve 7. In this way the small axial displacements which the drill undergoes in assuming slanting positions whilst oscillating are rendered possible, and on the other hand if the slot be made long enough the drill may be fed downward by means of the handwheel 12 whilst the conical sleeve 7 revolves, but does not move in a vertical direction. Situated above the tool holder 23 is the drill guide. The known adjustable drill guides are provided with interlocking teeth. Hence they do not completely embrace the polygonal shaft of drill and this diminishes the bearing surface between the drill shaft and the guide, and gives rise to increased wear of the shaft and the guide surfaces. This old arrangement also occasions a one-sided deviation of the drill. In the device made in accordance with the present invention the guide is also adjustable but it is so constructed as to embrace the whole surface of the drill shaft. It consists of guide plates 8 between which the guide blocks 3 are inserted. These guide blocks are held in position by nuts 31.

Figure 3:
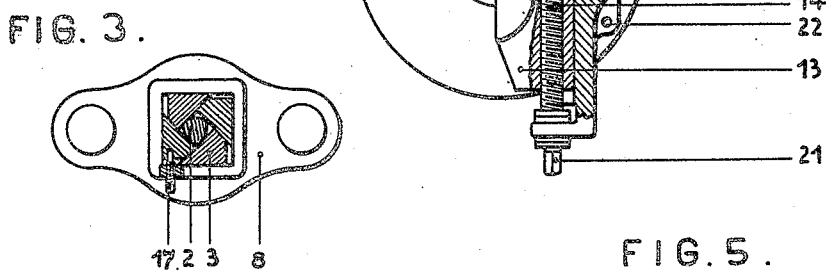
Fig. 3 shows the drill guide for four-cornered holes, Fig. 4 the drill guide for three-cornered holes and Fig. 5 the drill guide used for six-cornered holes.
Figure 4:
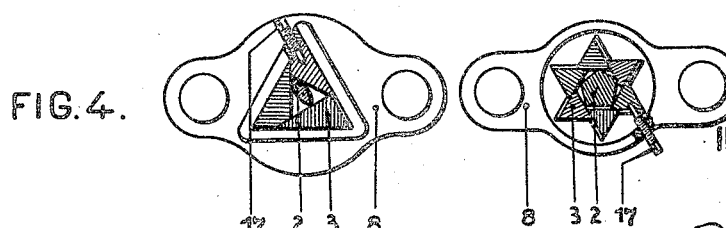
Figure 5:
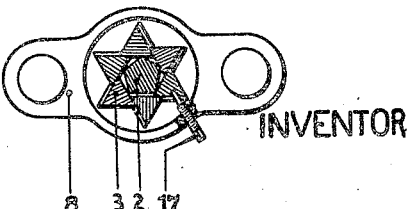

According to the shape of the holes to be drilled the drill 2 and its guide blocks 3 are shaped differently in the known manner, the cross section of a drill for four-cornered holes being three-cornered with three curved sides and that of a drill for three-cornered roles being two-cornered with two curved sides whilst the section of a drill for hexagonal holes is five-cornered. The number of guide blocks 3 provided for four-cornered holes is four, for three-cornered holes three, and for six-cornered holes six. The peculiar shapes and arrangements of these guide blocks are shewn in Figs. 3 to 5 these being such that the displacement of one guide block in a guide plate results in simultaneous displacements of its companion guide blocks and in an increase or decrease of the size of the polygonal hole that serves as a guide for the drill. The shifting or displacing of the guide blocks is accomplished by screws 17 (Figs. 1, 3, 4, 5).

I claim:

1. A device for drilling polygonal holes comprising a drill with a polygonal shaft, polygonal guide blocks, one side of each guide block abutting against a side of another guide block and the guide blocks being so disposed with respect to each other as to form a guide hole for guiding the polygonal shaft and corresponding in shape to the hole to be drilled, and means for altering the size of the said guide hole by positively shifting one of the said guide blocks so as to cause each succeeding block to move the one next to it.

2. A device for drilling polygonal holes comprising a drill with a polygonal shaft, polygonal cheeks, one side of each cheek abutting against a side of another cheek and the cheeks being so disposed with respect to each other as to form a guide hole for guiding the polygonal shaft and corresponding in shape to the hole to be drilled, means for altering the size of the said guide hole by positively shifting one of the said cheeks so as to cause each succeeding block to move the one next to it, a vertical pivot and a workholder beneath the said guide hole and adapted to swing on the said pivot.

3. A device for drilling polygonal holes comprising a drill with a polygonal shaft, triangular guide blocks, one side of each guide block abutting against a side of another guide block and the guide blocks being so disposed with respect to each other as to form a guide hole for guiding the polygonal shaft and corresponding in shape to the hole to be drilled, and means for altering the size of the said guide hole by positively shifting one of the said guide blocks, so as to cause each succeeding block to move the one next to it.

In testimony whereof I have signed this specification in the presence of two witnesses.

RUDOLF BARTHOLOMÄUS.

Witnesses:
HEDWIG ALBRECHT,
LEOPOLD UNGER.